United States Patent
Kuka (10) Patent No.: US 8,218,584 B2
(45) Date of Patent: Jul. 10, 2012

(54) APPARATUS FOR COUPLING LIGHT INTO AN OPTICAL WAVE GUIDE, A LASER SYSTEM WITH SUCH AN APPARATUS, AND A PREFORM TO MANUFACTURE THE APPARATUS

(75) Inventor: Georg Kuka, Berlin (DE)

(73) Assignee: fiberware, Generalunternehmen für Nachrichtentechnik GmbH, Mittweida (DE)

( * ) Notice: Subject to any disclaimer, the term of this patent is extended or adjusted under 35 U.S.C. 154(b) by 93 days.

(21) Appl. No.: 12/697,380

(22) Filed: Feb. 1, 2010

(65) Prior Publication Data

US 2010/0195678 A1    Aug. 5, 2010

Related U.S. Application Data

(60) Provisional application No. 61/234,446, filed on Aug. 17, 2009.

(30) Foreign Application Priority Data

Feb. 1, 2009    (DE) .......................... 10 2009 007 096

(51) Int. Cl.
    *H01S 3/067*    (2006.01)
(52) U.S. Cl. ................. 372/6; 385/45; 385/48; 385/126; 359/341.1; 359/341.3
(58) Field of Classification Search .................. 385/126, 385/45, 48; 372/6; 359/341.1, 341.3
    See application file for complete search history.

(56) References Cited

U.S. PATENT DOCUMENTS

| | | | |
|---|---|---|---|
| 5,864,644 A | 1/1999 | DiGiovanni et al. | |
| 6,324,326 B1 * | 11/2001 | Dejneka et al. | 385/123 |
| 6,987,783 B2 * | 1/2006 | Fajardo et al. | 372/6 |
| 2006/0078009 A1 * | 4/2006 | Katayama et al. | 372/6 |

FOREIGN PATENT DOCUMENTS

| | | | |
|---|---|---|---|
| JP | 57157207 A | * | 9/1982 |
| WO | WO 2007148139 A1 | * | 12/2007 |
| WO | WO 2008/062227 | | 5/2008 |

* cited by examiner

*Primary Examiner* — Jessica Stultz
*Assistant Examiner* — Joshua King
(74) *Attorney, Agent, or Firm* — Henry M. Feiereisen; Ursula B Day (57) ABSTRACT

The invention relates to an apparatus for coupling light into an optical wave guide, a laser system with such an apparatus, and a preform to manufacture the apparatus for coupling light into an optical wave guide with the aid of a pumping fiber to guide the light, whereby the optical wave guide comprises a core with a cladding and an initial length segment with a second length segment immediately connected to it, whose cross section increases in tapered form with respect to the first length segment. In order to make a powerful apparatus and thereby a powerful laser system available, including the corresponding preform, it is recommended that the core and cladding of the optical wave guide run continuously through the first length segment and the second length segment, that the end of the pumping fiber embedded in the cladding of the second length segment runs along the cladding and emerges from the forward face out of the end of the second length segment, and that the cross section of the cladding increases in tapered form. Preferably, the cross section of the pumping fiber increases together with the cross section of the second cladding.

8 Claims, 10 Drawing Sheets

APPARATUS FOR COUPLING LIGHT INTO AN OPTICAL WAVE GUIDE, A LASER SYSTEM WITH SUCH AN APPARATUS, AND A PREFORM TO MANUFACTURE THE APPARATUS

The invention relates to an apparatus for coupling light into an optical wave guide, a laser system with such an apparatus, and a preform to manufacture the apparatus in accordance with the terms of the claims 7, 1, and 9.

Laser systems with an optical wave guide (with a fiber optic guide) are known as fiber lasers. The mirroring of the end surfaces of the optical wave guide takes care of reflecting the laser light; the appropriately doped and mirrored core of the wave guide forms the actual laser resonator. The core is hereby surrounded by at least one cladding. To pump the core, light from diode lasers is coupled through optical wave guides (pumping fibers). Today there are in principle three possibilities for coupling light: a) laterally across the cladding area, b) on the forward face across the core and cladding, and c) across wave guide couplings following the method of fiber coupling. Optical wave guides are drawn from preforms.

A fiber laser with an optical wave guide formed from a core and cladding is already known from WO2008/062227A2. The doped core forms the active laser medium. Multiple pumping fibers are used to couple the pumping light, which form a fiber bundle, and are arranged around a central conducting fiber, whereby the conducting fiber is attached coaxially to the core of the optical wave guide. The fiber bundle reduces in terms of its cross section towards the optical wave guide; the fiber bundle and the optical wave guide are fused together on the facing ends. All pumping fibers end at the cladding of the optical wave guide. Both of the outmost lying ends of both conducting fibers are equipped with Bragg gratings to reflect the laser light.

Furthermore, a fiber laser with a cladded, pumped optical wave guide is known from U.S. Pat. No. 5,864,644, in which the pumping light is likewise coupled across the facing ends of a fiber bundle in the cladding, comprising multiple pumping fibers. The pumping fibers are likewise arranged around a central conducting fiber. The pumping fibers and the conducting fiber are reduced together down to a cross section that corresponds to the cross section of the optical wave guide. The fiber bundle and the optical wave guide are fused together at the facing ends.

The disadvantage of the known laser systems is that the effectiveness of the light coupling is relatively small, therefore normally using a multiplicity of pumping fibers, which is technically laborious and is difficult to manufacture.

The object of the invention is to make a powerful apparatus for coupling light into an optical wave guide and thereby a powerful laser system available, including the corresponding preform to manufacture the apparatus.

The object is achieved with respect to the apparatus through the features of the claim 9, with respect to the laser system through the features of the claim 1, and with respect to the preform through the features of the claim 11.

The solution with respect to the laser system provides that the core and cladding of the optical wave guide run continuously through the first length segment and the second length segment, that the end of the pumping fiber embedded in the cladding runs along the cladding and emerges from the forward face out of the end of the second length segment, and that the cross section of the cladding increases in tapered form. Here it is important that each pumping fiber leads into the cladding, i.e., the end of the pumping fiber is taken up by the cladding as it extends into it. Here it is technically simple when the pumping fiber is fused with the core to form an optical unit, whereby the manufacturing is further simplified when the core extends over the entire second length segment.

The manufacture is also technically simpler when the cross section of the core in the second length segment increases likewise in tapered form with respect to the first length segment.

If the cross section of the pumping fiber increases in tapered form together with the cross section of the cladding, the feedback is strongly reduced.

The efficiency of the light coupling may be improved when the optical wave guide is formed as a micro-structured multimode optical wave guide or as a PCF optical wave guide (Plastic-Cladding Silica Fiber). It is simple and effective when the micro-structured multimode optical wave guide is hereby formed with the aid of capillary-type hollow spaces, which lie next to one another under the cladding area at the edge of the cladding and each runs in the direction of the core.

For further improvement of the light coupling, it is recommended that the optical wave guide comprises a second cladding over the first cladding, the second cladding runs continuously through the first length segment and the second length segment, that the end of the pumping fiber embedded in the second cladding of the second length segment runs along the second cladding, and emerges from the forward face out of the end of the second length segment, and that the cross section of the second cladding increases in tapered form.

Particularly the cross section of the pumping fiber increases with respect to the first length segment together with the cross section of the second cladding.

The light coupling may also be improved when the optical wave guide by means of the second cladding is formed as a micro-structured multimode optical wave guide or as a PCF optical wave guide, particularly when the second cladding for the micro-structured multimode optical wave guide comprises capillary-type hollow spaces, which lie next to one another under the cladding area at its edge, and each runs in the direction of the cladding, and that the second cladding for the PCF optical wave guide is appropriately polymer-coated.

It is technically simpler when a pumping fiber is arranged only in the second cladding, and no pumping fiber is arranged in the first cladding.

It is advantageous for the size of the core-cross section when the optical refractive index of the first cladding runs periodically across the cross section with respect to the core, i.e., radially outwards, and in circumferential direction over multiple period lengths.

It is technically simple to achieve the periodic refractive index profile, when hollow spaces and/or correspondingly doped regions are arranged running parallel to the optical wave guide/core, each of which form a periodic arrangement over the cross section with respect to the optical wave guide. The manufacture is technically simple when the periodic refractive index profile is hexagonally periodic. The pumping fiber may also be expediently arranged in one of the hollow spaces.

The solution with respect to the apparatus provides that the core and cladding of the optical wave guide run continuously through the first length segment and the second length segment, that an end of the pumping fiber is embedded in the cladding of the second length segment, that the end of the pumping fiber embedded in the cladding runs along the cladding and emerges from the forward face out of the end of the second length segment, and that the cross section of the cladding increases in tapered form.

Particularly the cross section of the pumping fiber increases with respect to the first length segment together with the cross section of the second cladding.

The solution with respect to the preform provides that a pumping fiber arranged between the optical tubes and/or rods, or in one of the optical tubes extends into the preform across a partial length segment of the preform.

The invention is described more fully with reference to a drawing, in which.

Figure 1:
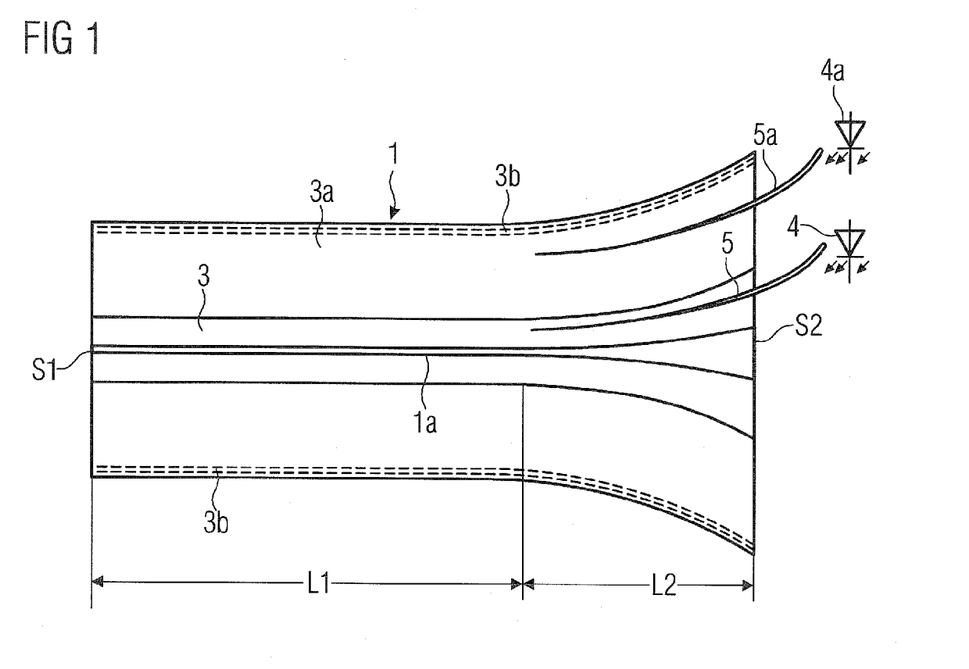
FIG. 1 shows a longitudinal section of a laser system with an optical wave guide.
Figure 2:
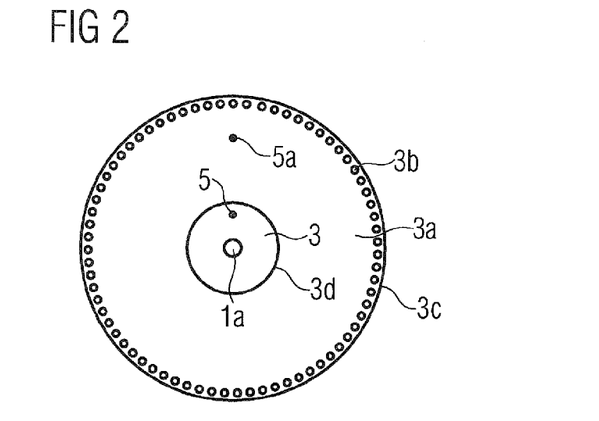
FIG. 2 shows a cross section of the laser system with an optical wave guide in accordance with FIG. 1.

FIG. 1 and FIG. 2 show a longitudinal and a cross section of a laser system with an optical wave guide 1, which comprises a core 1a that is appropriately doped to excite laser light and forms the active laser medium. The optical wave guide 1 is mirrored at least in the area of the core 1a on its flat end surfaces S1, S2. The mirrored core 1a forms the actual laser resonator of the laser system. A (first) cladding (a cladding layer) 3 is arranged around the core 1a.

Furthermore, as may be taken from FIG. 1, the optical wave guide 1 comprises a first length segment L1, over which the cross sections of the core 1a and of the cladding 3 remain the same (independently of their form and size). The outer diameter of the example circular cladding 3 and thus of the optical wave guide 1 may be up to 2 mm within length segment L1. The optical wave guide 1 continues into a tapered-formed second length segment L2, in which the cross sections of the core 1a and of the cladding 3 are (continuously) enlarged in tapered form with respect to the first length segment L1, up to the end area S2. Here the core 1a may also extend beyond the second length segment L2, for example to employ an optical Bragg grating instead of the mirroring.

A fiber optic guide serves to guide the light to pump the core 1a, here a pumping fiber 5, which extends through the end surface 52 into the cladding 3 of the tapered length segment L2, and specifically in the direction toward the length segment L1, along the core 1a (and along the cladding 3) respectively. The pumping fiber 5 is thus taken up by the cladding 3 and is (intimately) bound with it as an optical unit, here through fusing the cladding 3 with the pumping fiber 5 in the area of the surfaces bordering one another, i.e., the outer surface of the core 1a and the inner surface of the cladding 3.

The pumping fiber 5 may also be lodged into the length segment L1. The coupling of the light through the pumping fiber 5 thus occurs in the cladding 3. For the sake of simplicity, only one pumping fiber 5 is drawn within the cladding 3 in FIG. 1; however, multiple pumping fibers 5 may also lead into the cladding 3. In FIG. 1, the pumping fiber 5 is reduced in tapered form toward the length segment L1, which keeps the portion of the pumping light that is scattered back to the laser diode 5 small. (Although in principle, the cross section of the pumping fiber 5 could also remain constant.) Pumping is done by means of a laser diode 4, whose light is coupled hereby in the free end of the pumping fiber 5.

The cross section of the core 1a may additionally exhibit a longitudinal periodicity (of about 1 mm), in order to further improve the coupling of the pumped light in the core 1a.

The first and second length segment L1 and L2 of the optical wave guide 1 form together a multi-mode wave guide structure, which guides the coupled light as a multimode optical wave guide, whereas the core 1a operates as a monomode or multi-mode laser.

The optical wave guide 1 is formed as a micro-structured multimode optical wave guide. For this the cladding 3 is provided with a further covering, thus a second cladding 3a, (and thus with two cladding layers). The second cladding 3a comprises capillary-shaped hollow spaces 3b, which lie next to one another under the cladding area 3c at its edge, and each runs in the direction of the core 1a, i.e., each follows the longitudinal path of the core 1a and the second cladding 3a. A pumping fiber 5a extends likewise within the second cladding 3a from the tapered-formed second length segment L2 to the first length segment L1 into the second length segment L2, in which the light from the laser diode 4a is coupled. This is also combined with the optical wave guide 1 as an optical unit. Again, for the sake of simplicity, only one pumping fiber 5 is drawn in FIG. 1, which however may also stand for a multiplicity of pumping fibers 5a.

The optical wave guide 1 may also be alternatively formed as a PCF optical wave guide, which is known as Plastic-Cladding Silica Fiber. Analogous to the micro-structured multimode optical wave guide, a second cladding 3a is then likewise present, which however does not comprise any hollow spaces 3b, but instead is coated with an appropriate polymer.

In principle it is also possible to omit the second cladding 3a, and arrange the capillary-shaped hollow spaces 3b under the cladding surface 3d of the cladding 3, likewise lying next to one another at the edge and each running in the direction of the core 1a. However, then relatively little space is available for the inclusion of multiple pumping fibers 5.

On the other hand, the pumping fibers 5 in the first cladding 3 may also be completely omitted for an optical wave guide 1 with a second cladding 3a, if at least one pumping fiber 5a is present in the second cladding 3a for light coupling. In this case, the light coupling occurs solely over the second cladding 3a.

Figure 3:
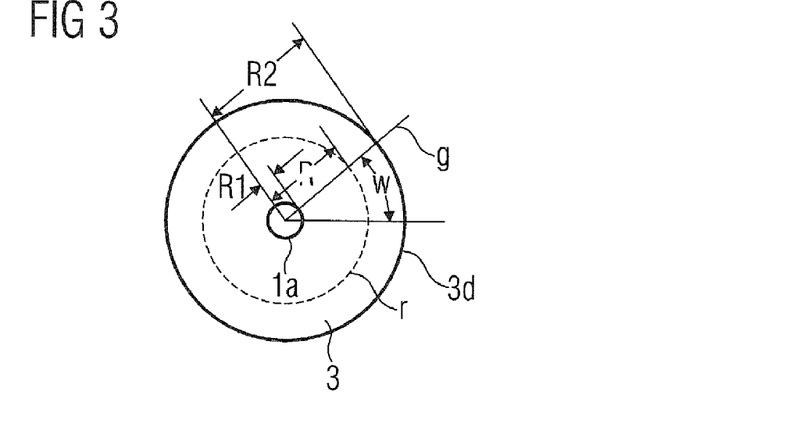
FIG. 3 shows a cross section of the optical wave guide in accordance with FIG. 1, to explain the periodic refractive index profile.

FIG. 3 shows the cross section of the optical wave guide 1 in the length segment L1, to explain the periodic refractive index profile in the cladding 3. For this, a line g running radially outward (at an angle w) and a ring r at a radial distance R from the midpoint M of the cross section of the optical wave guide 1 is drawn in FIG. 3. One recognizes that here the core 1a and the cladding 3 are constructed round (circularly); but other cross sections are also possible (such as mentioned above). Non-round cross sections may in particular be more advantageous for coupling (the "pumping"), whereas round cross sections are easier to manufacture.

Figure 4:
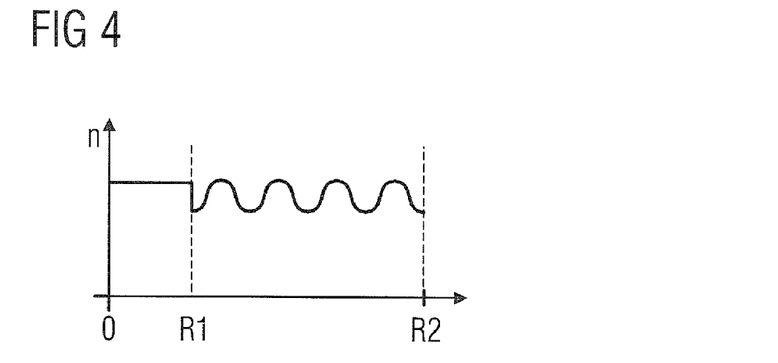
FIG. 4 shows the radial refractive index profile of the first cladding of the optical wave guide in accordance with FIG. 1.
Figure 5:
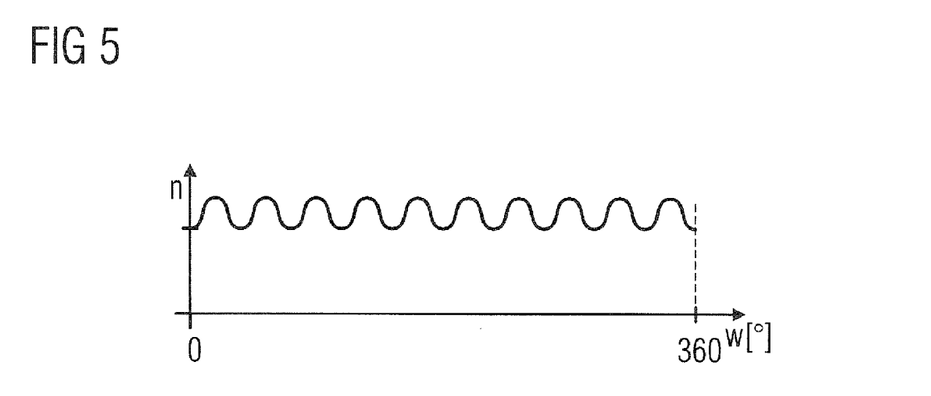
FIG. 5 shows the refractive index profile in circumferential direction for the first cladding of the optical wave guide in accordance with FIG. 1.

FIG. 4 shows furthermore the radial refractive index profile between the radii R1 and R2 for an angle w, and FIG. 5 shows the radial refractive index profile along the ring r (i.e., in circumferential direction) for a specified radius R. Both refractive index profiles exhibit a periodic alteration. This periodicity applies for all angles w of the optical wave guide 1 in radial direction (for all radii between R1 and R2), and over the entire length segment L1, and indeed over multiple periods respectively. The periodicity applies however over the length segment L2 only so far as this spatial periodic refractive index profile extends into the length segment L2. For the optical wave guide 1 in FIGS. 1 and 2, the spatial periodic refractive index profile extends over the entire length segment L1 and L2. However, the refractive index profile in the length segment L2 is hereby modified through the tapered increase in cross section; but the refractive index profile remains periodic and the number of the periods remains likewise the same.

The periodicity of the refractive index profiles (of a two-dimensional periodic structure such as here) permits larger core cross sections for the core 1a. However, the laser system also functions with a constant refractive index profile, when the required refractive index difference between core 1a and cladding 3 is maintained.

Figure 6:
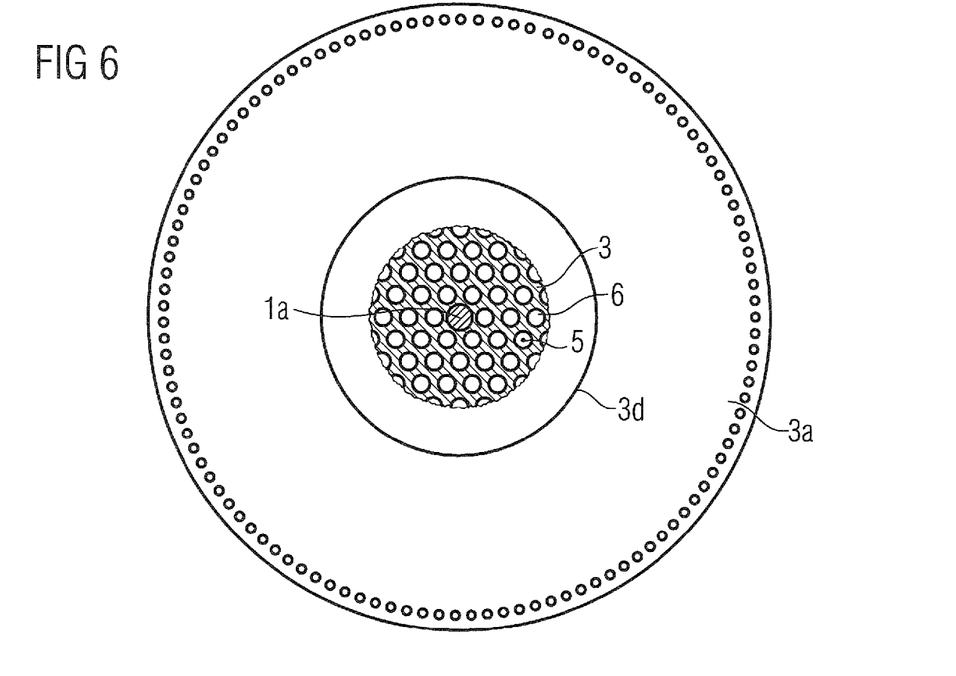
FIG. 6 shows a cross section of the optical wave guide with hollow spaces running parallel to the core.

FIG. 6 shows the cross section through the length segment L1 for an optical wave guide 1, for which the spatial periodic refractive index profile in the cladding 3 is formed through hollow spaces 6 running parallel to the core 1a, the hollow spaces 6 and the core 1a are thus arranged periodically across the cross section, here for example hexagonally periodical, or so to say with a polygonal pattern. Only one section of the core 1a is shown in detail here, with the hollow spaces 6 surrounding it (although not completely to scale, but instead somewhat enlarged). This arrangement with hexagonal symmetry in the cross sections of the hollow spaces 6 and of the core 1a comprises the periodicity of the refractive index profile in the cladding 3 described above. With regard to FIG. 1, the hollow spaces 6 extend over both length segments L1 and L2, whereby the cross sections over the length segment L2 are correspondingly enlarged. The pumping fiber 5 extending into the periodic refractive index profile may also be advantageously arranged in a hollow space 6 (entering into a hollow space 6).

The periodic arrangement of hollow spaces 6 around a core 1a with hexagonal symmetry corresponds approximately to an arrangement of optical hollow fibers, in which the core 1a is embedded, and which are combined as an optical unit, for example through fusing.

Figure 7:
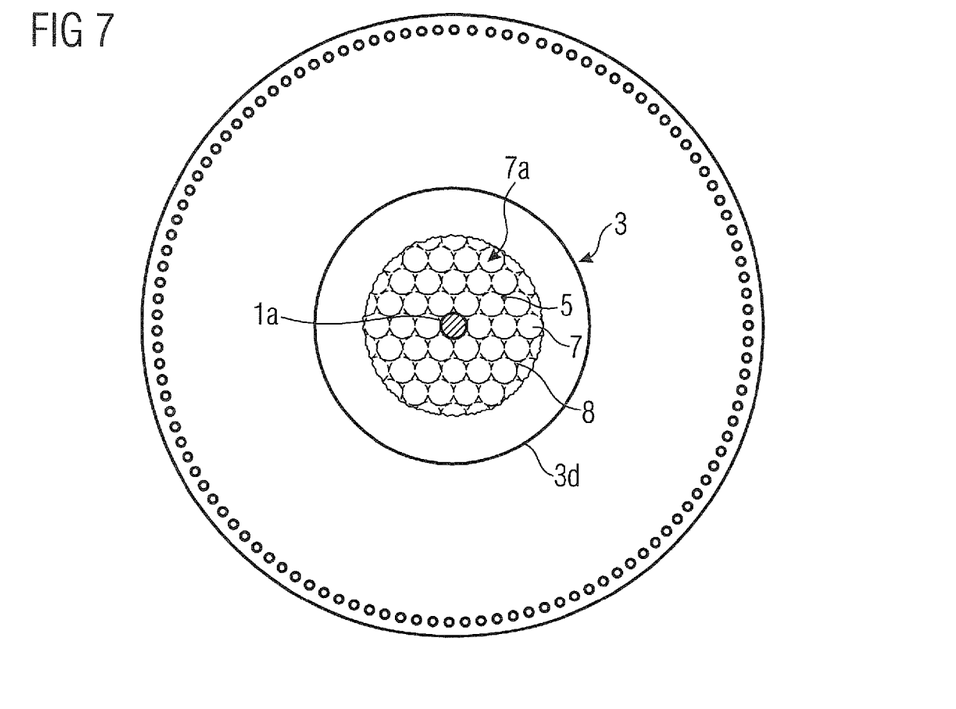
FIG. 7 shows a cross section of the optical wave guide with full fibers running parallel to the core.

A similar construction results when one uses full fibers 7 instead of the hollow fibers, with a particular refractive index, and embeds the core 1a in this before fusing. This is shown in FIG. 7, whereby for better understanding the original outer surfaces, i.e., the outer surfaces of the full fibers 7 before fusing, are sketched in with dotted lines and labelled with the reference number 8. The cladding 3 then generally speaking comprises regions running parallel to the core 1a, whereby the above-mentioned particular refractive index is formed for example through photonic crystal regions 7a. Photonic crystal regions 7a are known as optical fibers with spatial periodic structures, which are drawn from corresponding photonic crystal rods.

The core 1a may also be arranged eccentrically in the cladding 3 or 3a respectively. It is likewise possible to arrange multiple cores 1a eccentrically within the laser system. The cores 1a may here be placed so that they couple with one another optically, as is known from fiber couplings.

Figure 8:
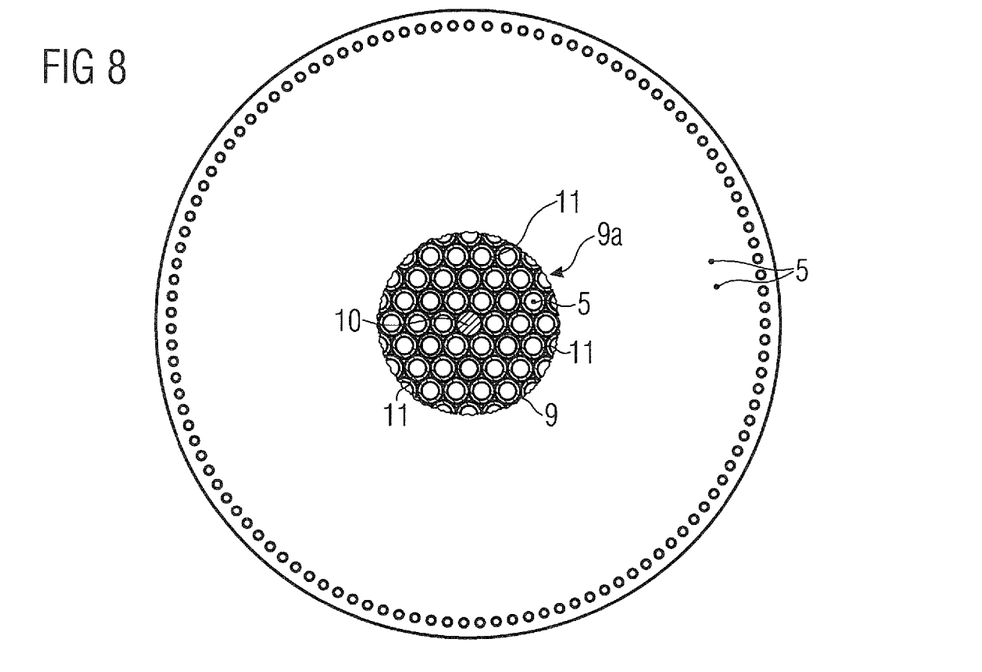
FIG. 8 shows a cross section of a preform to manufacture a laser system according to FIG. 1 with tubes.

FIG. 8 shows a cross section of a preform to manufacture a laser system according to FIGS. 2 to 7. It comprises an optical laser rod 10, whose core region is doped in such a manner, that after drawing the preform, a core 1a is formed as active laser medium. The optical laser rod 10 is embedded in a multiplicity of parallel running optical tubes 11, whereby the thickness of the embedment is multiple diameters of the tubes 11. After drawing, the embedment forms the cladding 3 mentioned above. The tubes 11 form a periodic (hexagonal) arrangement over the cross section. A pumping fiber 5 is lodged into one of the tubes 11 (or multiple pumping fibers 5 are lodged in the tubes 11) in the preform 9a. The pumping fiber 5 (pumping fibers 5) may also be arranged between the tubes 11.

Further tubes or rods (not shown) are arranged around the tubes 11, which after drawing, form the second cladding 3a, whereby pumping fibers 5a are also lodged into the tubes or between the rods. These tubes collapse during drawing, thus forming the second cladding 3a without hollow spaces. In place of these tubes, rods may also be arranged around the tubes 11, whereby the pumping fibers 5a are lodged between the rods (in the interstitial spaces formed by the rods lying next to one another). At the very edge around the entire circumference, tubules are also arranged, which form the capillary-shaped hollow spaces 3b after drawing.

If no pumping fibers 5, but only pumping fibers 5a are lodged into the preform 9a, then after drawing only pumping fibers 5a are present in the second cladding 3a, but not in the first cladding 3. In principle, pumping fibers 5 or 5a may be arranged in the first cladding 3 and/or second cladding 3a.

The optical wave guide 1 is manufactured from the preform 9a through drawing in a corresponding drawing facility. The drawing speed is hereby set so that after drawing the length segment L1, the drawing speed is reduced in such a manner that subsequently the desired tapered-formed length segment L2 results.

The remaining stump of the preform 9a beyond the length segment L2 is not removed, in particular since the coupling pumping fibers 5 and/or 5a extend out of it. The optical laser rod 10 is correspondingly mirrored or equipped with reflecting end regions on its end surface to manufacture the optical wave guide function.

The optical wave guide 1 is pumped by means of the laser diode 4, whose light is hereby coupled in the end of the pumping fiber 5 and/or 5a extending out of the stump.

Figure 9:
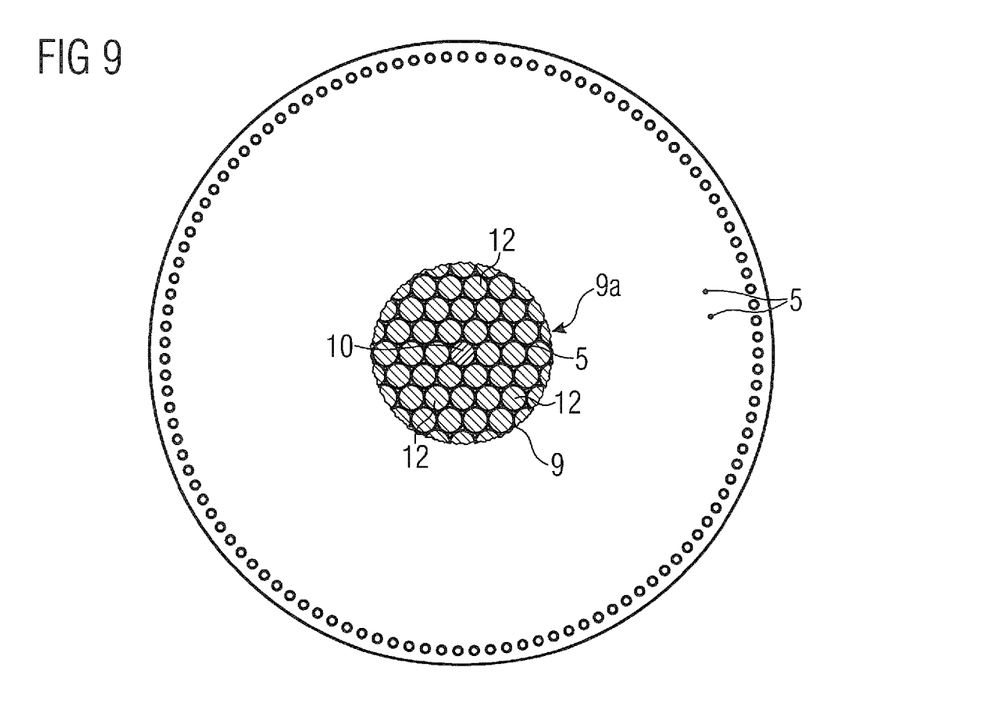
FIG. 9 shows a cross section of a preform to manufacture a laser system according to FIG. 1 with rods.

The tubes 11 may alternatively also be replaced by doped glass rods 12; FIG. 9 shows a cross section 9 of a preform 9a with rods 12 in place of tubes 11. The pumping fiber 5 is located here in the interstitial spaces between the rods 12 and/or in the area of the second cladding 3a, corresponding to the description of FIG. 8.

The laser system thus comprises a (apparatus to) coupling of light in an optical wave guide 1, which comprises a core 1a and a cladding. The optical wave guide 1 and thus the laser system comprises furthermore a first length segment L1 (not tapered in form), and a second length segment L2 immediately connected to it, whose cross section increases in tapered form with respect to the first length segment L1, whereby the cross sections of the core 1a and of the cladding increase (but at least the cross section of the cladding increases) in tapered form (continuously) with respect to the first length segment L1. Core 1a and cladding of the optical wave guide 1 run hereby continuously from the first length segment L1 to the second length segment L2. The end of a pumping fiber is embedded in the cladding of the second length segment L2 (and is fused with the cladding).

The end of the pumping fiber embedded in the cladding runs along the cladding and emerges from the forward face out of the end of the second length segment L2 (and thus extends out of the end of the second length segment L2). This is to say: the end of the pumping fiber lodges in the forward face of the cladding.

Preferably, the cross section of the pumping fiber embedded in the cladding increases together with the cladding cross section with respect to the first length segment L1 (up until the non-drawn original pumping fiber-cross section).

Figure 10:
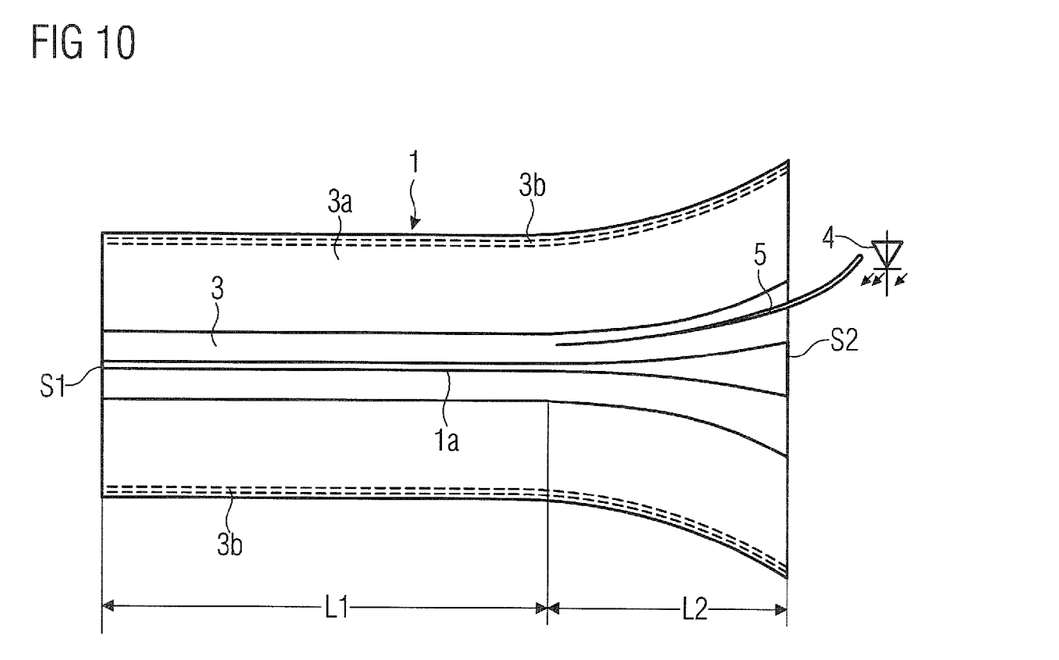
FIG. 10 shows a cross section of the laser system with an optical wave guide in accordance with FIG. 1, with at least one pumping fiber only in the first cladding.
Figure 11:
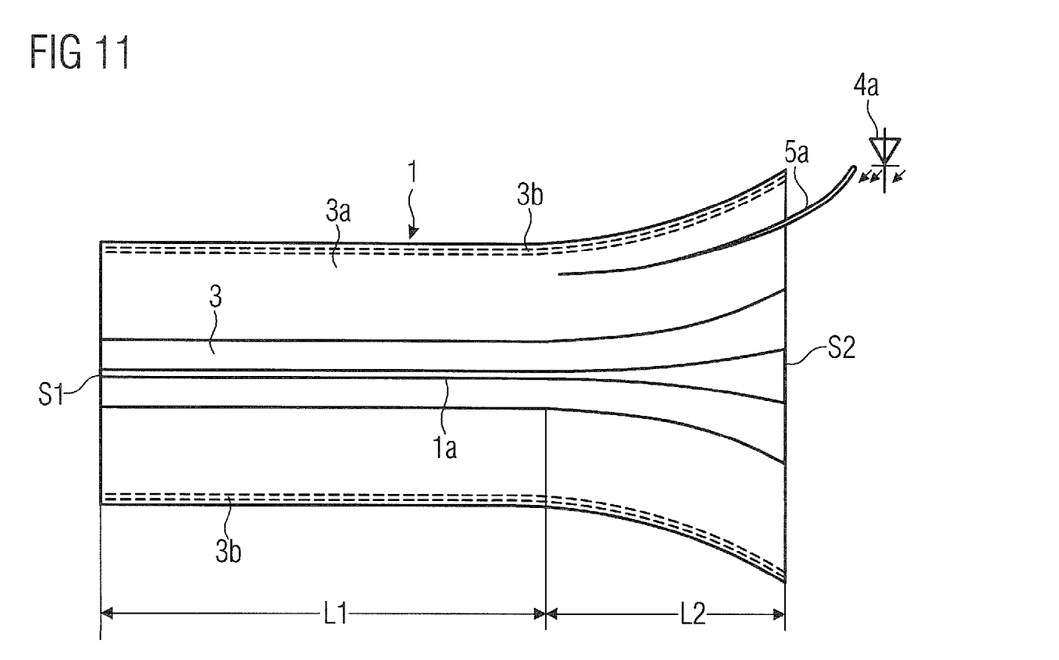
FIG. 11 shows a cross section of the laser system with an optical wave guide in accordance with FIG. 1, with a pumping fiber only in the second cladding.
Figure 12:
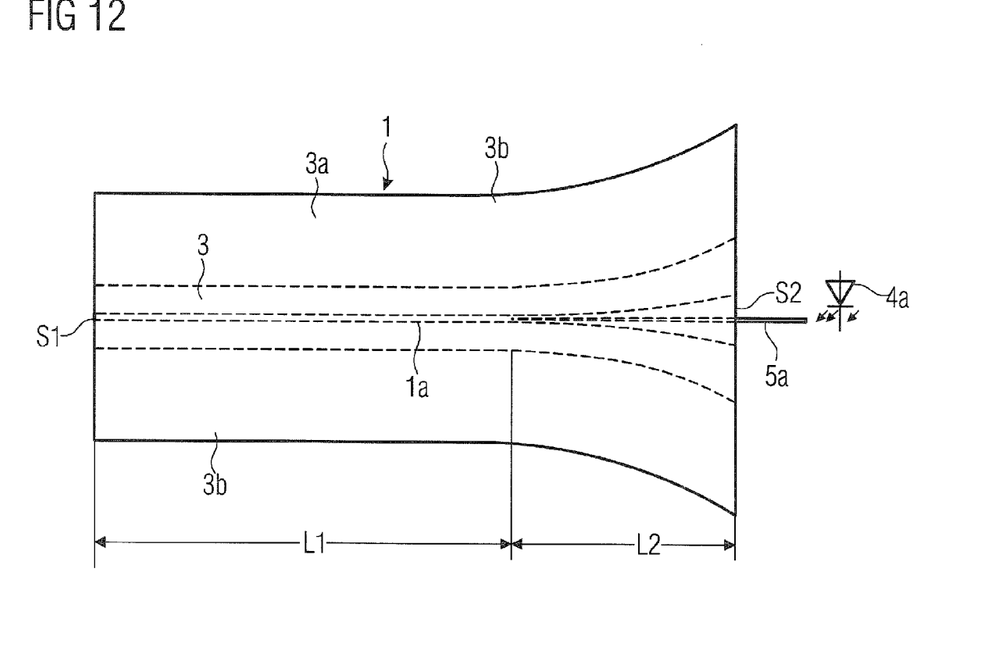
FIG. 12 shows the laser system with an optical wave guide in accordance with FIG. 11 in a top view.
Figure 13:
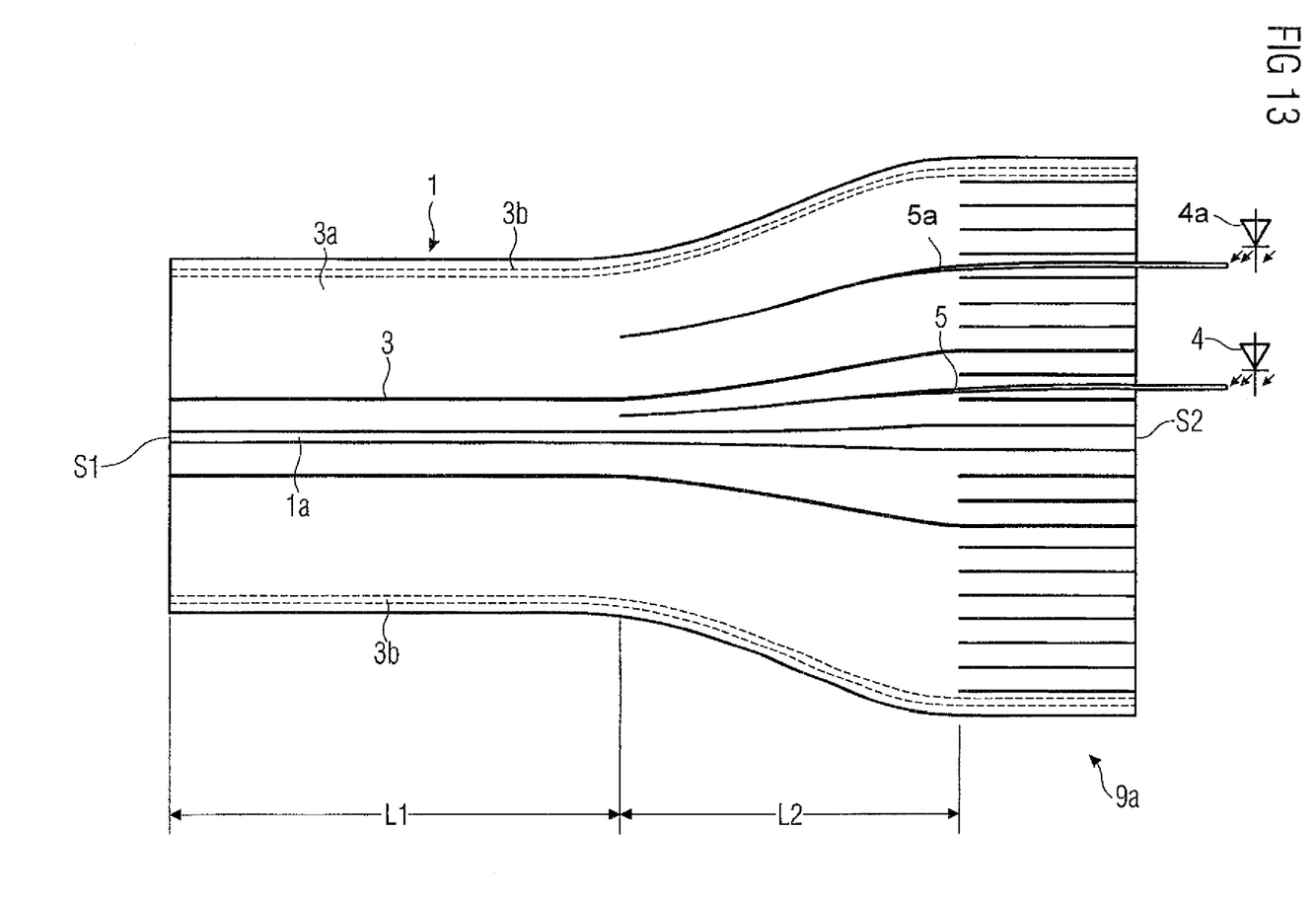
FIG. 13 shows the longitudinal section of a laser system of FIG. 1, showing more clearly the stump of the preform.
Figure 14:
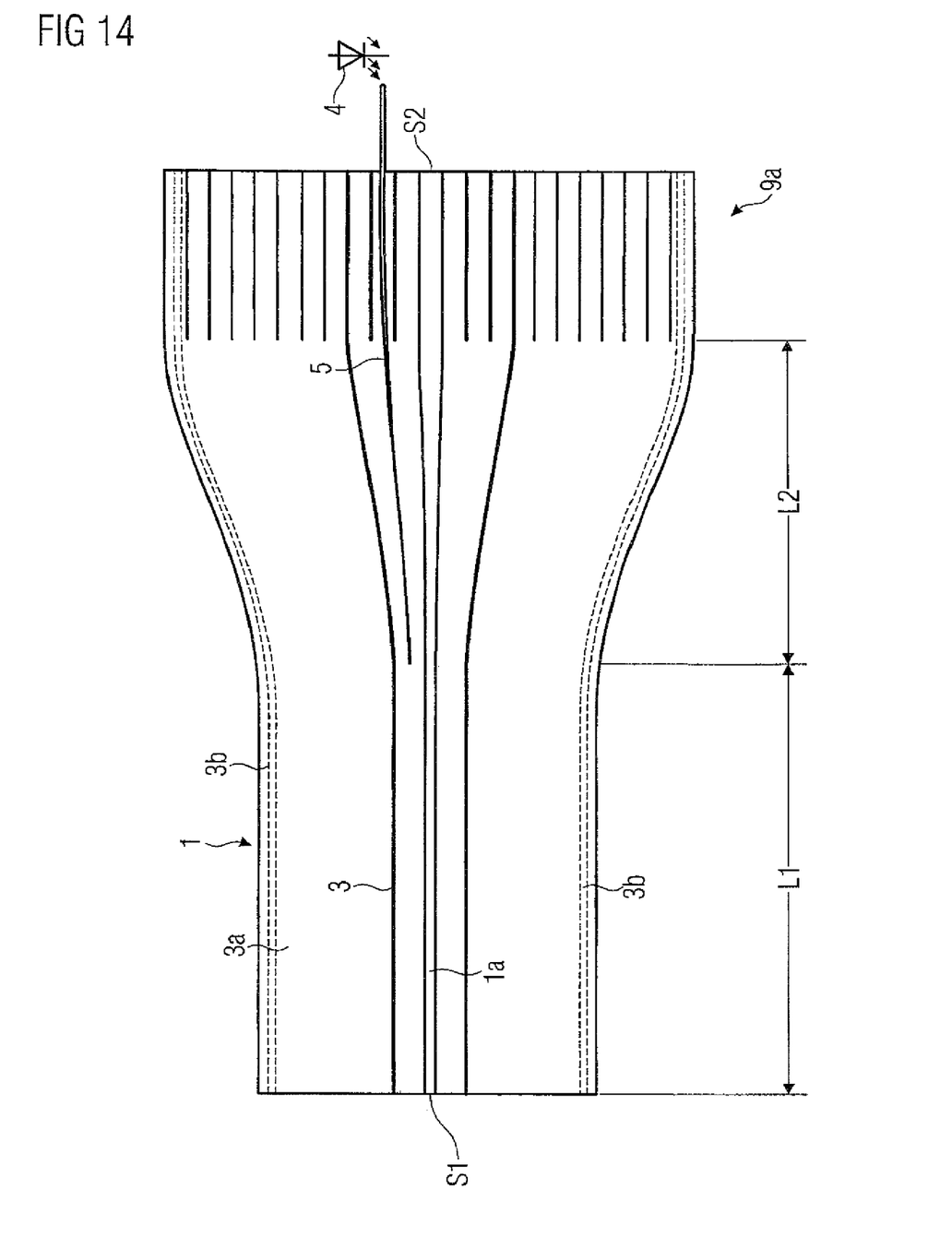
FIG. 14 shows the longitudinal section of a laser system of FIG. 10, showing more clearly the stump of the preform.
Figure 15:
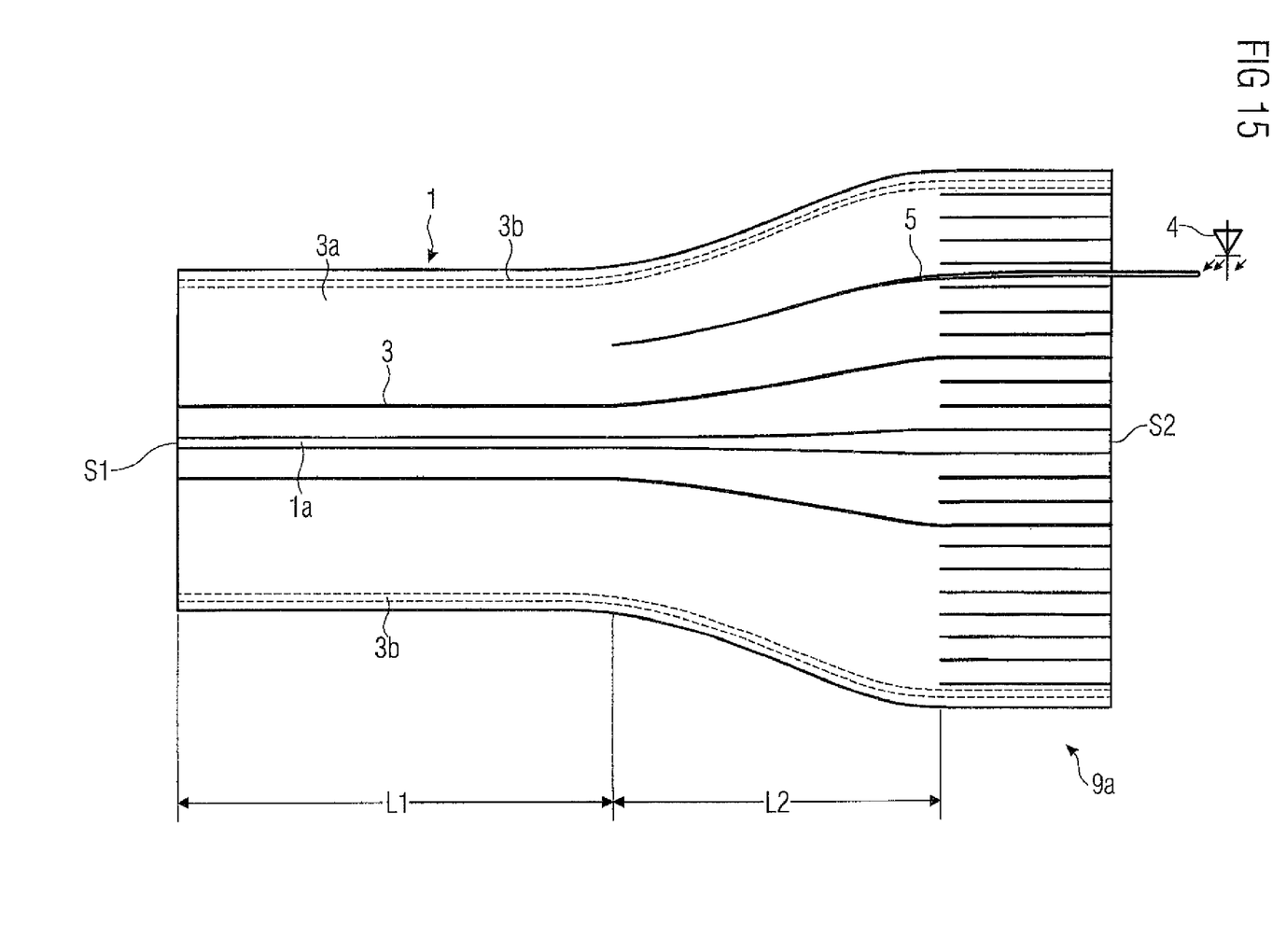
FIG. 15 shows the longitudinal section of a laser system of FIG. 11, showing more clearly the stump of the preform.
Figure 16:
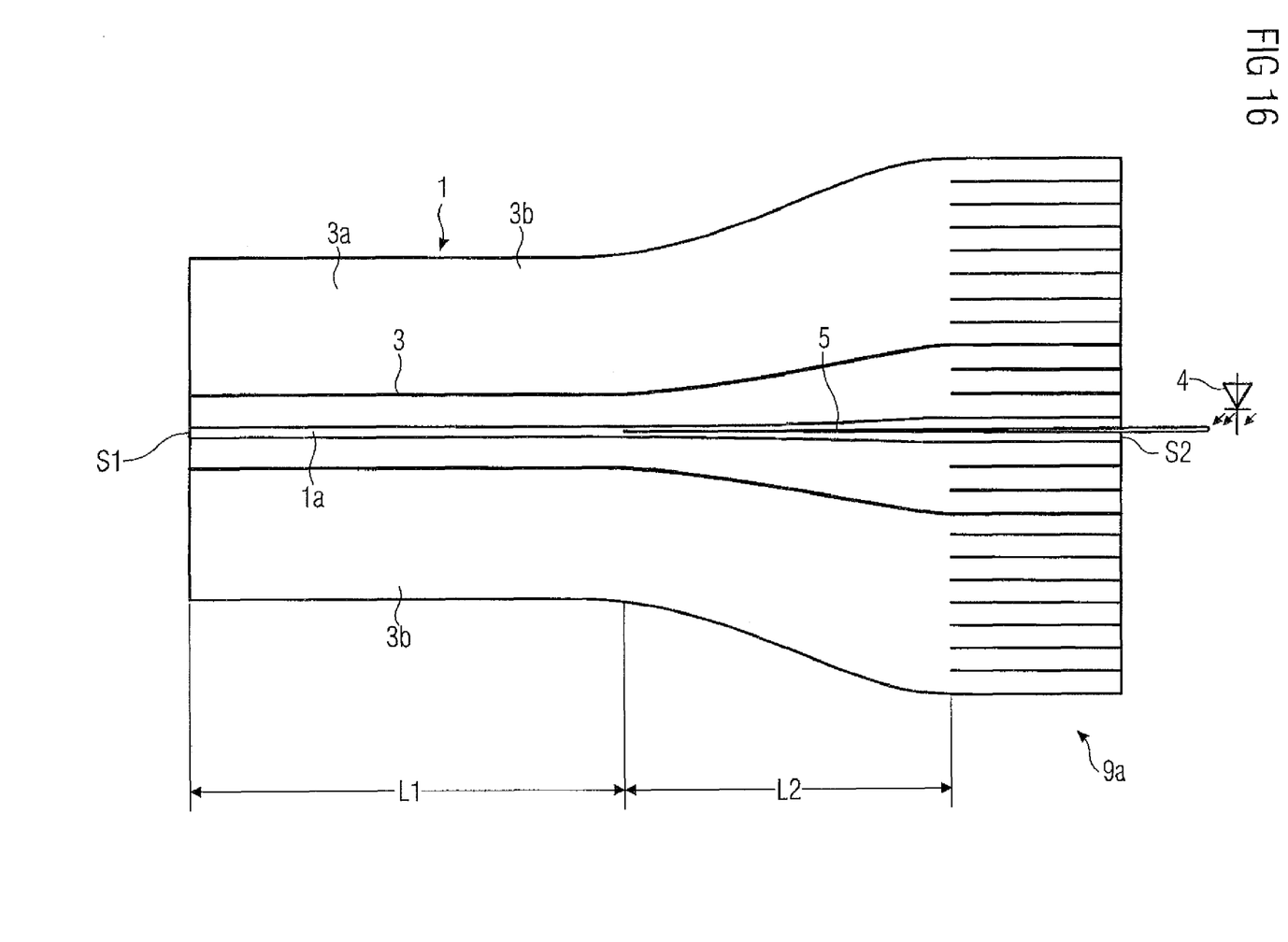
FIG. 16 shows the longitudinal section of a laser system of FIG. 12, showing more clearly the stump of the preform.

If the optical wave guide 1 comprises a single pumping fiber and multiple claddings 3, 3a, the pumping fiber may be lodged in one of these claddings 3, 3a (pumping fiber 5 in the cladding 3, or pumping fiber 5a in the cladding 3a). This is shown in FIGS. 10 and 11; FIG. 12 shows the corresponding top view. If multiple pumping fibers are present, these may also be distributed over both claddings 3, 3a (pumping fibers 5 in the cladding 3 and pumping fibers 5a in the cladding 3a as in FIG. 1) or be lodged in only one of the claddings 3 or 3a (all pumping fibers 5 in the cladding 3, or all pumping fibers 5a in the cladding 3a).

The invention claimed is:

1. A laser system, said laser system comprising:
    an optical wave guide, which comprises a core and a first cladding, whereby the core is doped as an active laser media to excite laser light at least within its core, and forms a laser resonator with its ends that reflect the laser light, and
    a first pumping fiber to couple pumped light into the optical wave guide,
    wherein the optical wave guide comprises a first length segment and a second length segment connected to the first length segment, with a cross section of the second length segment increasing with a taper with respect to the first length segment,
    wherein the first pumping fiber extends from the tapered second length segment to the first length segment,
    wherein cross sections of the first pumping fiber, the first cladding and the core increase with a taper commensurate with the tapered cross section of the second length segment,
    wherein the core and first cladding of the optical wave guide run continuously through the first length segment and the second length segment, and
    wherein an end of the first pumping fiber is embedded in the first cladding of the second length segment and runs along the first cladding, and emerges from the forward face out of the end of the second length segment.

2. The laser system of claim 1, wherein
    the optical wave guide is formed as a micro-structured multimode optical wave guide or as a PCF optical wave guide.

3. The laser system of claim 1, wherein
    the optical wave guide comprises a second cladding over the first cladding,
    the second cladding runs continuously through the first length segment and the second length segment,
    an end of a second pumping fiber embedded in the second cladding of the second length segment runs along the second cladding and emerges from the forward face out of the end of the second length segment,
    and a cross section of the second cladding increases with a taper.

4. The laser system of claim 3, wherein
    the optical wave guide is formed as a micro-structured multimode optical wave guide or a PCF optical wave guide by means of the second cladding.

5. A preform to manufacture the laser system as set forth in claim 1, said preform comprising:
    at least one optical laser rod, having a core region which is doped in such a manner, that after drawing the preform, it forms an optical wave guide with a core as an active laser medium,
    wherein the optical laser rod is embedded in a multiplicity of parallel running optical tubes and/or rods,
    wherein the embedment extends multiple tube or rod diameters, and
    wherein a pumping fiber arranged between the optical tubes and/or rods or in one of the optical tubes extends across a partial length segment of the preform into the preform.

6. The laser system of claim 1, wherein
    the optical wave guide is made by a preform,
    the optical wave guide comprises a third length segment connected to the second length segment,
    the third length segment is a remaining stump of the preform comprising at least one optical laser rod, which forms the core of the optical wave guide in the third length segment,
    wherein the first pumping fiber extends from the third length segment to the first length segment,
    the core of the optical wave guide runs continuously through the first, second and third length segment,
    the first cladding of the optical wave guide runs continuously through the first and second length segment, and
    an end of the first pumping fiber emerges from the forward face out of the end of the third length segment.

7. An apparatus, said apparatus comprising:
    An optical waveguide;
    A pumping fiber to couple light into the optical waveguide;
    wherein the optical wave guide comprises one core and a cladding, which comprises a first length segment and a second length segment directly connected to the first length segment, with a cross section of the second length segment increasing with a taper with respect to the first length segment,
    wherein the pumping fiber extends from the tapered second length segment to the first length segment,
    wherein cross sections of the first pumping fiber, the first cladding and the core increase with a taper commensurate with the tapered cross section of the second length segment,
    wherein the core and the first cladding of the optical wave guide run continuously through the first length segment and the second length segment, and
    wherein an end of the first pumping fiber is embedded in the first cladding of the second length segment and runs along the first cladding, and emerges from the forward face out of the end of the second length segment.

8. The apparatus of claim 7, wherein
    the optical wave guide is made by a preform,
    the optical wave guide comprises a third length segment connected to the second length segment,
    the third length segment is a remaining stump of the preform comprising at least one optical laser rod, which forms the core of the optical wave guide in the third length segment,
    the first pumping fiber extends from the third length segment to the first length segment,
    the core of the optical wave guide runs continuously through the first, second and third length segment,
    the first cladding of the optical wave guide runs continuously through the first and second length segment, and
    an end of the first pumping fiber emerges from the forward face out of the end of the third length segment.

* * * * *